Oct. 11, 1949. A. F. ALLWEIN 2,484,541
PRESSURE MEASURING INSTRUMENT
Filed Oct. 18, 1944 3 Sheets-Sheet 1

INVENTOR.
ALOYSIUS F. ALLWEIN
BY
C. B. Spangenberg
ATTORNEY.

Oct. 11, 1949.  A. F. ALLWEIN  2,484,541

PRESSURE MEASURING INSTRUMENT

Filed Oct. 18, 1944   3 Sheets-Sheet 2

*INVENTOR.*
ALOYSIUS F. ALLWEIN

BY *C.B. Spangenberg*
ATTORNEY.

Oct. 11, 1949.   A. F. ALLWEIN   2,484,541
PRESSURE MEASURING INSTRUMENT
Filed Oct. 18, 1944   3 Sheets-Sheet 3

INVENTOR.
ALOYSIUS F. ALLWEIN
BY
ATTORNEY.

Patented Oct. 11, 1949

2,484,541

UNITED STATES PATENT OFFICE 2,484,541

PRESSURE MEASURING INSTRUMENT

Aloysius F. Allwein, Philadelphia, Pa., assignor, by mesne assignments, to Minneapolis-Honeywell Regulator Company, Minneapolis, Minn., a corporation of Delaware Application October 18, 1944, Serial No. 559,154

11 Claims. (Cl. 318—32)

The present invention relates to differential pressure measuring instruments, and more particularly to pressure measuring instruments of this type which can be used as a ship's log to measure the speed of a ship.

In measuring the speed of ships there is usually provided a rod meter or Pitot tube that extends from the hull of the ship into the water. As the ship moves the tube creates a differential pressure that is applied through suitable mechanism to move an indicator calibrated in terms of ship's speed. It has been determined that the coefficients of the Pitot tube will vary with the shape of the ship's hull; with its position in the hull and with the ship's speed. Accordingly the mechanism mentioned above must be provided with adjustments to take care of these variables as well as other variables such as the range of the ship's speed and the type of indication desired.

It is an object of the present invention to provide a mechanism to indicate accurately the speed of a ship. The system includes a Pitot tube connected to a differential pressure responsive device. As a pressure responsive element of this device is deflected due to a change in ship's speed it moves one element of a capacitance type power amplifier relative to a second stationary element of said amplifier. This relative movement acting through a suitable amplifying relay is used to simultaneously return the pressure responsive element to its original, normal position and to move an exhibiting element over a suitable scale. In the mechanism used to return the pressure responsive element to its original position there is provided a means to extract the square root of the reading so that the exhibiting element may be moved linearly in response to ship's speed. There is also provided a means to continuously compensate for the change in coefficient of the Pitot tube as the ship's speed changes.

It is an object of the invention to provide a power set differential pressure measuring instrument that may be used to measure the values of the pressure through a great range. The instrument is of the null balance type in that the primary pressure responsive element is always returned to a neutral position upon the occurrence of any pressure change. Therefore the characteristics of the pressure responsive element do not enter into the calibration of the instrument.

It is a further object of the invention to provide a power set pressure measuring instrument. In the instrument of the present invention the primary responsive element serves to unbalance a capacitance type power amplifying system. The rebalancing of this system returns the primary element to its original position and simultaneously moves an exhibiting or controlling element to a position corresponding to the pressure being measured. This latter movement may be in linear relation to the changes in pressure or may be in some other relation thereto. For example, in the use of the instrument described herein, the differential pressure varies in accordance with the square of the speed of the ship. Therefore a means is provided to extract the square root of the pressure reading so that the exhibiting element for the ship's speed may be moved across a linear scale.

It is a further object of the invention to provide a differential pressure instrument of general application which may be used to measure the pressure difference between any two points.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
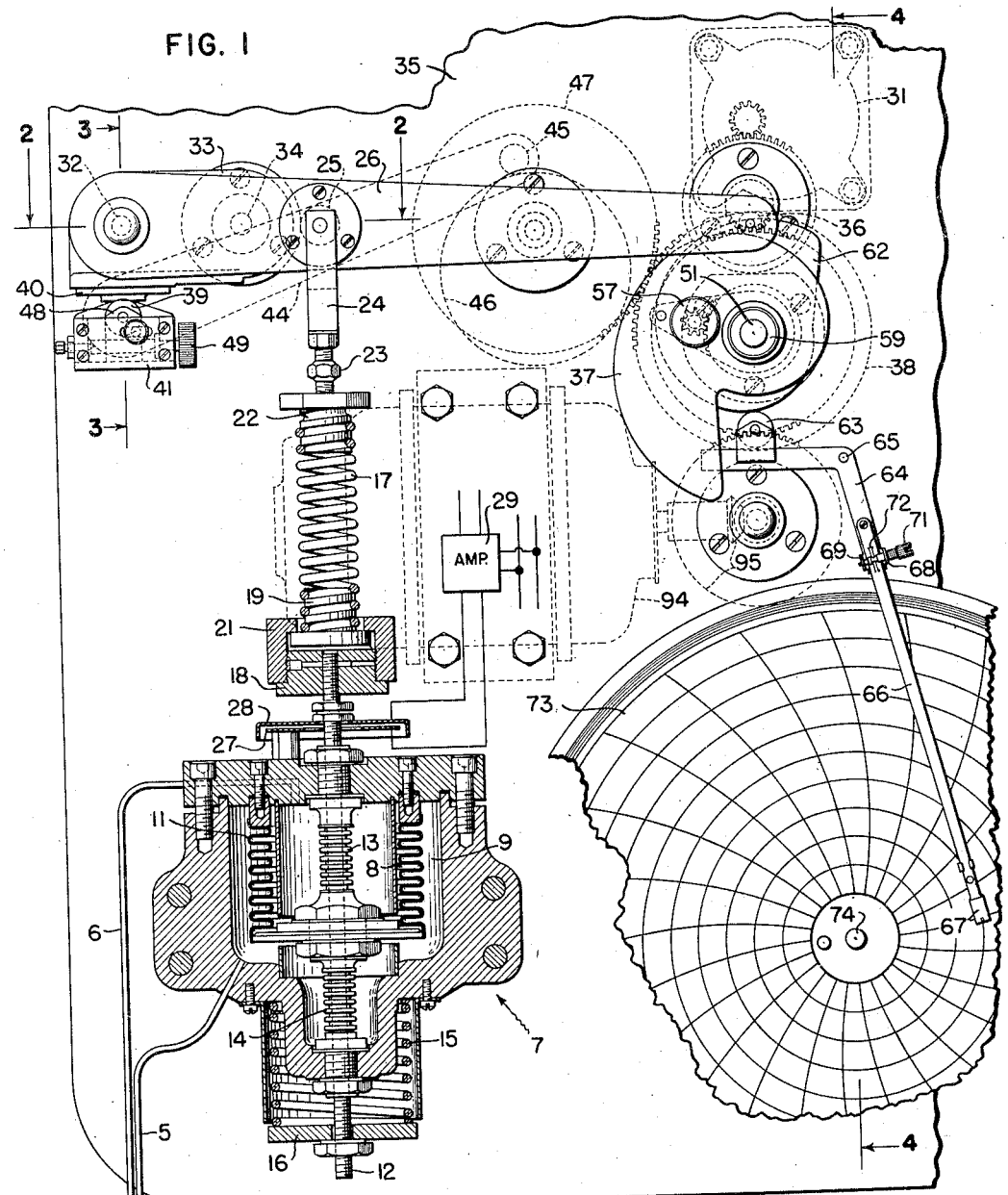
Figure 1 is a front view of the entire mechanism 10 with parts thereof in sections.
Figure 2:
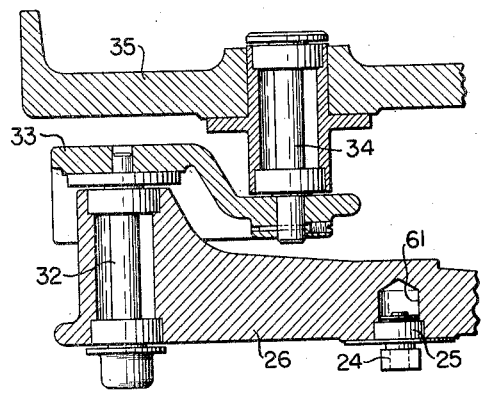
Figure 2 is a section taken on line 2—2 of Figure 1.

Referring first to Figure 1, there is shown a rod meter of Pitot tube 1 which extends through the ship's hull 2 into the water. This Pitot tube is provided with a static opening 3 and a dynamic opening 4 which openings are connected respectively by tubes 5 and 6 to a differential pressure responsive element 7. The tubes 5 and 6 terminate in a low pressure chamber 9 and a high pressure chamber 8 respectively, which are separated by a bellows 11 that is attached to the casing 7 of the pressure element. Sealing bellows 13 and 14 are placed in the chambers so that a position transferring rod 12 that is attached to the end wall of bellows 11 may extend through both ends of the casing. The system is placed under initial tension by a spring 15, one end of which bears against a shoulder formed on the outer surface of the casing 7 while the other end is supported by a disc 16 that is suitably attached to the lower end of the rod 12. The differential pressure applied to the casing 7 and the force of the spring 15 are overcome by a second spring 17 that is attached to the upper end of the rod 12.

For this purpose the rod is provided with a threaded member 18 that is keyed to its upper end. A threaded plug 19 having an enlarged head is screwed into the lower end of the spring and is held adjacent the member 18 by means of a cap 21 in the manner best shown in the drawing. The upper end of the spring is also provided with a threaded plug 22 that receives one end of a turnbuckle 23, the upper end of which is received by a support 24. The support has a roller 25 on it which pivotally engages a lever 26 in a manner to be described. In the operation of the device, as the ship moves to the left in Figure 1, a differential pressure will be created by the Pitot tube and applied through the tubes 5 and 6 to the opposite sides of the bellows 11. This differential pressure will increase substantially in accordance with the square of the ship's speed. As the speed of the ship increases the bellows 11 will be elongated to move the rod 12 downwardly. This movement acts through a capacitance follow-up system to produce an upward movement of the lever 26 which movement tensions the spring 17 to return the bellows 11 to its original length.

The capacitance follow-up system may well be of the type described in the application of Rudolph Wild, Serial No. 537,505, filed on May 26, 1944. In order to actuate this system there is provided a fixed condenser plate 27 that is fastened to the upper part of casing 7 and a movable condenser plate 28 that is attached to but insulated from the rod 12. Movement of the rod 12 disturbs the relative position of the condenser plates 27 and 28 to unbalance the capacitance system. System unbalance is detected and amplified by an amplifier 29 that acts in a manner described in the Wild application to energize a motor 31 for rotation in one direction or the opposite direction. This motor, acting through mechanism to be described, moves lever 26 in the proper direction to return the bellows 11 to its original length. The lever 26 is pivoted at its left end on a pivot pin 32 which projects from the left end of a locating lever 33 that is in turn pivoted at 34 to the frame 35 of the instrument. It is noted that the differential pressure element 7 is also mounted on the frame 35 below the lever 26. The other end of the lever 26 is provided with a roller 36 that bears on the end of a cam 37 which is driven by gearing 38 from the motor 31. Since the speed of the ship varies substantially in accordance with the square root of the differential pressure it is desirable to extract the square root of this pressure so that the movement of the cam can be linear. To this end the cam 37 is shaped in accordance with the square root law so that as the motor 31 rotates this cam, the lever 26 will be moved to compensate for the law of the pressure change.

Figure 3:
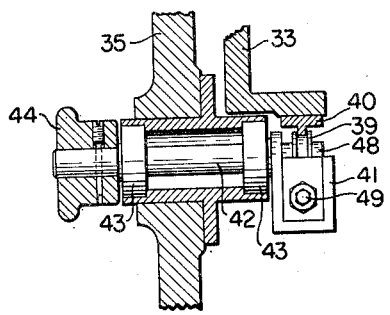
Figure 3 is a section taken on line 3—3 of Figure 1.

The left end of lever 26 may be raised and lowered for compensating purposes to be described below. This is accomplished by means of a roller 39 that engages a bearing surface 40 formed on the lower portion of locating lever 33. The roller 39 is mounted in a carriage 41 that is attached to a shaft 42 which is rotatably supported in bearings 43 in the frame 35. The shaft 42 has attached to its rear end, as shown in Figure 3, a lever 44 which has a roller 45 on its other end that bears against the surface of a cam 46. The cam 46 is driven through gearing 47 from the motor 31. It will be seen that if the roller 39 is positioned concentric with the shaft 42, movement of lever 44 will have no effect on the lever 33. If, however, the roller 39 is moved in Figure 1 to the right or to the left of shaft 42, the left end of locating lever 33 and of lever 26 will be raised or lowered as the lever 44 is moved around its pivot 42. The roller 39 is therefore mounted in a slider 48 that can be shifted to the right and to the left in carriage 41 by means of an adjusting screw 49.

Figure 4:
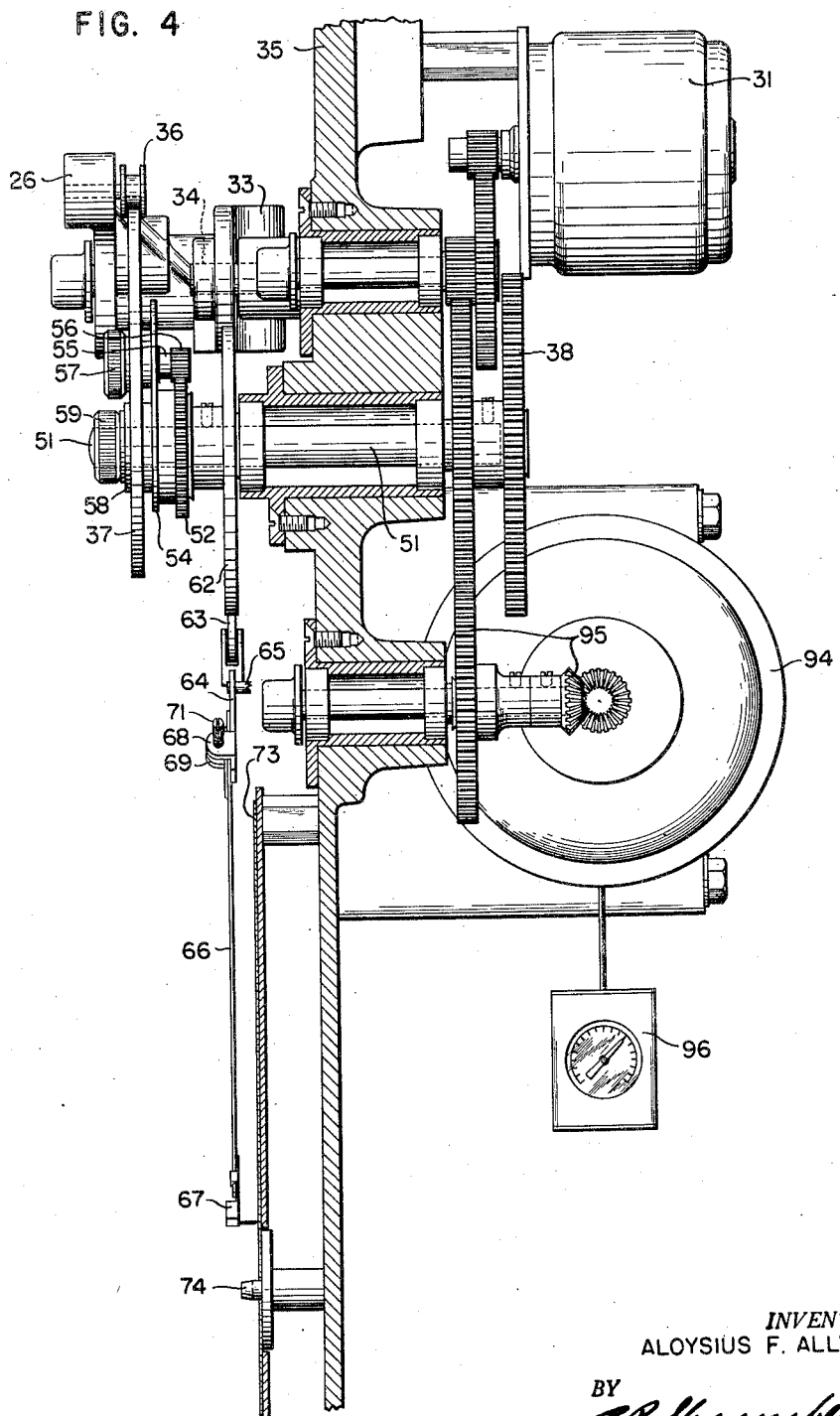
Figure 4 is a section taken on line 4—4 of Figure 1.

As is best shown in Figure 4, the gearing 38 driven by the motor 31 serves to rotate a shaft 51 that is journaled in the frame 35 of the instrument. The cam 37 is adjustably fastened to the shaft 51 in a manner now to be described. As shown in Figure 4 a gear 52 is rigidly attached to the shaft 51. The cam 37 and a plate 54 that is attached thereto are rotatably mounted on the extending end of the shaft so that they may be adjusted with respect to the shaft. The plate and cam serve together as a rigid support for a shaft 55 that has a pinion 56 on it which meshes with the gear 52. As a knob 57 on the shaft 55 is rotated the pinion 56 will walk around the gear 52 so that the cam may be accurately adjusted with respect to the shaft 51. The cam is then fastened to the shaft 51 by means of an enlarged washer 58 that is forced against the cam by a knob 59. It is noted that the lever 26 is provided with a socket 61 which receives the roller 25 on the upper end of the spring support 24.

In the operation of the device as a whole, as the differential pressure across the bellows 11 is changed, the capacitance power amplifying system will be unbalanced to produce an energization of motor 31 in one direction or the other. This motor rotates the cam 37 to move lever 26 around its pivot 32 to increase or reduce the tension on spring 17 and thereby bring the bellows 11 back to its original length and the condenser plate 28 back to its original position with respect to the condenser plate 27 to rebalance the capacitance system. Since the cam 37 is shaped in accordance with the square root law the shaft 51 will rotate linearly with respect to the ship's speed so that the rotation of this shaft is directly in proportion to the speed of the ship.

In order to change the range of the instrument the strength of the spring 17 may be changed by adjusting the plug 22 into or out of the end of this spring. This changes its effective length because the number of the free turns of the spring is altered. Since it is necessary that the distance between the lever 26 and the end of rod 12 always be the same at zero differential pressure in order that the bellows 11 will be returned to its neutral position, the turnbuckle 23 must be adjusted each time the plug 22 is adjusted. The zero point of the instrument and some slight range changes are determined by the adjustment of the cam 37. The adjustment of the cam 37 when taken into account with the adjustment of the effective length of spring 17 can therefore be used to shift the zero of the instrument as well as to change the range thereof.

As is well known the relation between velocity and head or differential pressure can be computed by the expression $V = C\sqrt{2gh}$ in which V stands for velocity, C is the coefficient for the system which is usually assumed to vary linearly in one direction or the other as the head increases, $g$ stands for gravity, and $h$ is the head or, in this case, differential pressure. The extraction of the square root of the expression under the radical is accomplished by the cam 37. Another cam is shaped to supply the equivalent of a linear increase or decrease of the coefficient with the rise of the cam determined by the maximum increase or decrease believed necessary for the class of service for which the instrument is used. More or less of this coefficient can then be inserted in the instrument as desired. The corrections necessary and the coefficient may be computed in different ways. If the spring 17 is adjusted so that the coefficient is one at zero speed of the ship and changes linearly with changes in the ship's speed the correction will be larger than, for example, if the spring is adjusted so that the coefficient is one at 100% of scale of the instrument. In the first method the correction needed will be zero at zero speed and will become larger as the speed increases. In the second method the correction will be zero at both 100% speed and at zero speed with values assuming substantially the shape of a sine curve at intermediate speeds. Usually the curve will be displaced with little or no correction needed at low values. The method of computation used will depend upon circumstances surrounding a given installation.

It has been found that the coefficient of the Pitot tube will vary with the shape of the hull of the ship and will also vary as the speed of the ship changes. Some means must therefore be provided to compensate for this coefficient change to take care of the instrument when it is mounted in different types of ships and as the ships move at varying speeds. When the compensation or amount of correction needed has been computed it is introduced into the instrument by the movement that is imparted to the left end of the lever 26 in addition to that which is given by the cam 37 to the right end of the lever.

In calibrating the ship's log it is customary to run the ship over a measured distance at varying speeds and to plot these speeds against the differential pressure produced by the instrument. The difference between the measured differential pressure and that which should theoretically have been obtained due to speed is the amount of correction that is needed and the amount that must be introduced by the movement of the left end of lever 26.

After the above mentioned tests have been run and the curves plotted, the cam 46 is shaped in accordance with these curves and this cam is used to move the lever 44. Since the cam 46 is driven by the motor 31 and this motor is rotated in accordance with the pressure differential created by the Pitot tube, it will be seen that the cam 46 will be rotated in accordance with ship's speed. Therefore the type of movement imparted to the roller 39 and through this roller to the lever 26 is determined by the shape of the cam. The amount and direction of correction that is obtained for any cam 46 will be determined by the amount roller 39 is moved to the right or to the left of the center of shaft 42.

Since it is desirable to have an indication or a record of the speed at which the ship has been travelling provision has been made for this purpose. To this end a cam 62 has been placed on shaft 51 which cam has a linear rise in it so that a roller 63 bearing against the periphery of this cam is moved in proportion to the ship's speed. The roller may be mounted for radial adjustment on one arm of a bell crank lever 64 that is pivoted at 65. Mounted for pivotal movement on the lever 64 is a pen arm 66 that has a pen 67 on its lower end. To this end a pair of wings 68 and 69 are provided on the lower end of bell crank 64 through which a screw 71 having a reduced portion extends. The reduced portion of the screw cooperates with a raised portion 72 on the pen arm 66. Therefore as the screw 71 is rotated it will move axially and shift the pen arm around its pivot. The pen 67 moves across a suitably graduated chart 73 that is mounted on a chart hub 74 which hub may be rotated at a suitable speed by a conventional clock drive. Movement of the roller 63 along the arm 64 gives what is known as a range adjustment since as the distance between this roller and the pivot shaft 65 varies, the pen arm will be moved varying amounts for a given raise of the cam 62. The adjustment between the pen arm 66 and the bell crank 64 gives what is known as a zero adjustment since the pen arm 66 may be adjusted to place the pen 67 over the zero point of the chart for varying positions of the bell crank 64.

In some cases it may be desirable to have an integrator to indicate the total distance which is travelled by the ship. Any suitable type of integrator may be used for this purpose. It is preferred however that an integrator of the type shown in the application of John G. Booth, Ser. No. 559,153, filed October 18, 1944, now Patent No. 2,444,329, be used for this purpose.

Figure 5:
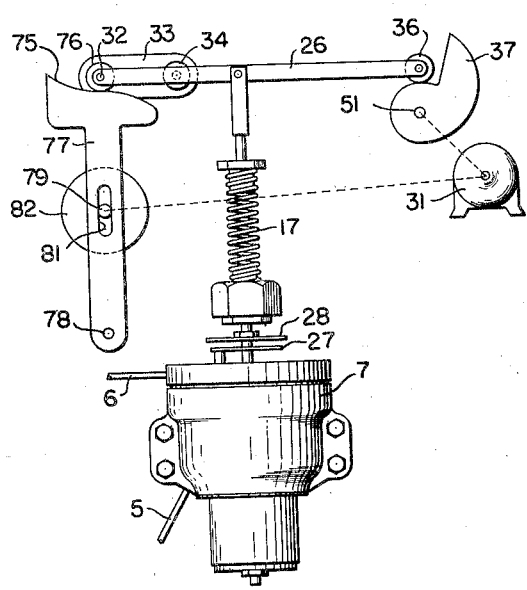
Figure 5 is a view of a modification showing a different type of compensating means.

Basically the ship log takes the same form but several different types of mechanism may be used to compensate for the changing coefficient of the Pitot tube. Another type of compensating means is shown, for example, in Figure 5 of the drawing. In this figure there is shown diagrammatically the lever system and differential pressure element which have been described above. In this case, however, the compensation is supplied by means of a cam surface 75 that supports a roller 76 which is mounted concentric with the pivot 32 extending between levers 26 and 33. This cam is formed on the upper end of a lever 77 that is pivoted at 78. Movement is imparted to the lever 77 by means of a pin 79 that is received in a slot 81 formed in the lever. This pin is mounted on a disc 82 that is rotated by the motor 31 in a manner similar to that in which the cam 46 was rotated from the motor 31 in Figure 1 of the drawing. The amount of motion imparted to the lever 77 by the pin 79 will depend upon the amount that this pin is displaced from the axis of the disc 82. The direction in which the lever 77 is moved for a given rotation of motor 31 will depend upon whether the pin 79 is displaced above or below the axis of the disc 82. The disc 82 is geared to rotate one quarter of a revolution for a complete revolution of cam 37.

The cam 75 is shaped to supply the equivalent of a linear increase or decrease of the coefficient with the height of the ends of the cam determined by the maximum increase or decrease believed necessary for the class of service for which the instrument is used. The amount and direction of correction needed for any particular installation depends on the position of pin 79 above or below the center of disc 82. Therefore it will be seen that after the cam surface 75 has been shaped to give the proper correction, more or less of this correction may be inserted as needed by varying the position of pin 79.

Figure 6:
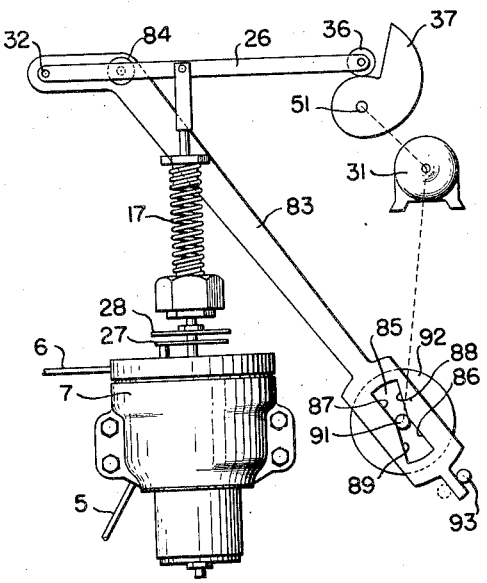
Figure 6 is a further modification showing another type of compensating means.

A means for inserting a correction that takes the form of a sine curve that starts at some point above zero speed is shown in Figure 6, in which parts of the mechanism that have previously been mentioned are shown diagrammatically and have the same reference numerals applied thereto. In this case the left end of lever 26 is supported by the pivot 32 on the left end of a bell crank lever 83 that is pivoted at 84. The lever 83 has formed in its lower end an hour glass shaped opening 85 that has sides 86 and 87 which are parallel to the direction in which the lever extends and sides 88 and 89 that are radially disposed from the center of the opening but are set at an angle to the sides 86 and 87. The angle between the sides 87 and 88 and between the sides 86 and 89 will vary in accordance with the point in the ship's speed where it is necessary to begin to apply the correction. Motion is imparted to the lever 83 by means of a pin 91 that is located in a disc 92 which is rotated by the motor 31, and which in this case rotates 180° for each rotation of cam 37. It is noted that the spring 17 will tend to bias the lever 83 in a counter-clockwise direction and therefore a stop 93 is necessary to hold this lever in its neutral position against the bias of the spring.

In the operation of the device the pin 91 will not impart any motion to the lever 83 if this pin is concentric with the axis of rotation of the disc 92. If, however, the pin is displaced from this axis it will begin to impart motion to the lever 83 after it has moved through an angle equal to the angle between surfaces 86 and 89 or surfaces 87 and 88. Assume for example that the disc 92 is rotated in a clockwise direction by motor 31 and the pin 91 is displaced along the edge 86 from the position shown. With this position of the parts, clockwise rotation of the disc 92 will move lever 83 around pivot 84 to raise the left end of lever 26 and begin to insert the correction for the coefficient C in the system only after the disc 92 has rotated through some predetermined angular distance corresponding to some predetermined speed. If the pin 91 was displaced in the opposite direction along the edge 87 of the opening 85 and the disc 92 was rotated in the same direction as before, the lever 83 will be moved in a counter-clockwise direction. In this case, however, the stop pin 93 will be moved to the dotted line position or below the projecting end of the lever 83 and a spring which will offset the effect of the spring 17 will be necessary in order to hold the lever 83 in its zero position.

The ship log mechanism which has been described above is usually located some place in the ship that is adjacent the point in the ship's hull through which the Pitot tube is projected. It is desirable however to have an indication of the ship's speed at various points throughout the ship. To this end therefore a transmitting system such as synchronous or "Selsyn" transmitter may be used. Accordingly there is shown in Figure 4 a transmitter 94 that is driven through gearing 95 from the motor 31. This transmitter can be used to operate any number of receivers that are located in repeater stations 96 that may be placed in various parts of the ship.

It will be seen from the above description that I have devised a ship log mechanism which is capable of being used on ships having various speed ranges and hull shapes. It will also be apparent to those skilled in the art that the mechanism above described can be used to indicate and record the value of any differential pressure such as that created by the flow of a fluid past an orifice. One of the features of invention is the use of a power set mechanism which requires a very small power supply for the primary measuring element and the provision of means whereby power can be suitably amplified by the mechanism described to move a pen and to transmit the readings to locations remote from the location of the instrument itself. Another feature of the invention is the provision of means to compensate for the change in coefficient of the primary measuring element through the operating range of the instrument.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a ship log mechanism, the combination of an element movable in response to ship's speed, a pivoted lever, resilient means connecting said element and lever, a balanceable electric circuit, means operated by said element to unbalance said circuit as said element moves in response to changes in ship's speed, means operated by said circuit upon unbalance thereof to move said lever around its pivot in a predetermined fashion, said lever acting through said resilient means to return said element to its original position, and means driven by said operated means to additionally move said lever an amount varying with the speed of the ship each time said circuit is unbalanced.

2. In a ship log system, the combination of a pressure responsive element movable in response to variations in a differential pressure applied thereto, means to set up a differential pressure to be applied to said element which differential pressure varies as the ship's speed varies, a pivoted lever having a movable pivot point, a resilient connection between said lever and said element, a cam operative to move said lever around its pivot, means including a balanceable electrical circuit that is unbalanced as said element moves, a reversible motor operated in response to circuit unbalance, means to rotate said cam by said motor to thereby return said element to its original position, and means also operated by said motor to shift the pivot point of said lever an amount depending upon the value of said differential pressure before and after its change.

3. The combination of claim 2 including means acting on said movable pivot point to adjust the direction and extent the pivot of said lever is moved for a given amount and direction of rotation of said motor.

4. A pressure measuring instrument comprising, a Pitot tube producing a differential pressure in response to changes in speed an element movable from a zero position in response to a differential pressure applied thereto, resilient means to oppose the action of said element, a pivoted lever, means to attach said resilient means between said element and said lever, reversible motor means to move said lever around its pivot in a direction to expand or contract said resilient means and thereby return said element to its zero position upon a departure therefrom, a capacitance type amplifying mechanism to control operation of said motor means, and means to vary the capacity of said amplifying system operated by said element as it moves from its zero position.

5. A pressure measuring instrument comprising, an element movable from a zero position upon the application of pressure changes thereto, a pivoted lever, resilient means extending between said lever and element, a balanceable electrical network, means operated by said element as the latter moves from its zero position to unbalance said network, motor means energized for rotation by said network in a direction depending upon the direction of network unbalance, cam means rotated by said motor means to move said lever around its pivot in a direction to act through said resilient means to return said element to its zero position and rebalance said electrical network, and means operated by said motor means to shift the pivot of said lever as said cam moves.

6. A pressure measuring instrument comprising an element movable from a zero position in response to pressure changes applied thereto, a pivoted lever, a connection between said element and lever, a balanceable electrical network, means forming part of said network moved by said element to unbalance said network as said element moves out of its zero position, reversible motor means energized for rotation by said network, as the latter becomes unbalanced, a cam rotated by said motor and operative to move said lever around its pivot to return said element to its zero position, and means to shift the position of said cam relative to said lever for a given position of said element including a stationary gear mounted concentric with said cam, a pinion rotatably mounted on said cam and meshing with said gear and means to rotate said pinion.

7. A pressure measuring instrument comprising an element movable from a zero position in response to pressure changes applied thereto, a pivoted lever, a connection between said lever and element, a relay mechanism, means operated by movement of said element to produce movement of said relay mechanism, means operated by said relay mechanism to shift said lever around its pivot and return said element to its zero position, and means also operated by said relay mechanism to shift the pivot of said lever, said last means including adjustable parts so that the pivot of said lever may be shifted in one direction or an opposite direction for a given operation of said relay mechanism.

8. A measuring instrument comprising a movable element, a Pitot tube producing a differential pressure to move said element to either side of a neutral position in response to variations in a variable condition, resilient means to oppose movement of said element from said neutral position, a movable lever, means to attach said resilient means to said element and to said lever whereby movement of either said element or said lever flexes said resilient means, reversible motor means to move said lever in a direction to act on said resilient means so that it applies more or less force to said element to return said element to its neutral position upon a departure therefrom, a capacitance type amplifying mechanism to control operation of said reversible motor means, and means to vary the capacity of said amplifying system operated by said element as it moves from its neutral position.

9. In a ship log mechanism, the combination including, a pressure responsive device having an element deflecting in accordance with a differential pressure applied thereto, means having a variable coefficient to produce a differential pressure varying in accordance with a given law as the ship's speed varies, means to apply said differential pressure to said deflecting element, means for varying the capacity of an electric circuit connected so as to be operated by said deflecting element, an amplifying electric circuit containing said capacity varying means, a motor connected to said circuit so as to be rotated in one direction or the other when said circuit is unbalanced due to a change in its capacity, a spring stressing said deflecting element in the opposite direction to said differential pressure, and means driven by said motor to vary the stress applied by said spring to said deflecting element and to restore said deflecting element to a neutral or balanced position.

10. In a ship log mechanism, the combination, including, means to create a pressure differential varying as the ship's speed varies, said means having a coefficient that varies as the ship's speed varies but not necessarily in the same manner as said pressure differential varies, an element upon which said pressure differential is impressed and which moves in response thereto, a motor means controlled by said element to move in a direction dependent upon the deflection thereof, an electric condenser connected so as to be moved by said element, a normally balanced electric circuit containing said condenser and said motor means so that said motor means rotates in one direction or the other upon a change in the capacity of said condenser, mechanism operated by said motor means to return said element to a neutral position, and means also to move said element to compensate for changes in the coefficient of said first mentioned means.

11. In a ship log mechanism, a Pitot tube extending through the ship's hull into the sea so as to produce a differential pressure upon changes in the ship's speed, a differential pressure responsive device having an element movable in response to changes in the differential pressure of the Pitot tube, a condenser having relatively movable plates connected to said deflecting element for movement therewith, an amplifying circuit including said condenser, an electric motor connected to said amplifying circuit so as to rotate in one direction or the other upon unbalance of the amplifying circuit due to changes in the capacity of the condenser, a lever mounted for movement upon movement of said motor, a spring interposed between said lever and said deflecting element to turn said deflecting element and said condenser to a neutral position, and a mounting for said lever adjustable in accordance with the coefficient of the Pitot tube.

ALOYSIUS F. ALLWEIN.

REFERENCES CITED

The following references are of record in the file of this patent:

UNITED STATES PATENTS

| Number | Name | Date |
| --- | --- | --- |
| 1,816,957 | Chrisman et al. | Aug. 4, 1931 |
| 1,968,539 | Rydberg | July 31, 1934 |
| 2,059,271 | Parker | Nov. 3, 1936 |
| 2,107,976 | Blasig | Feb. 8, 1938 |
| 2,154,375 | Chambers | Apr. 11, 1939 |
| 2,305,878 | Krussmann et al. | Dec. 22, 1942 |
| 2,409,435 | Ketay et al. | Oct. 15, 1946 |